June 5, 1923.
P. MUELLER
1,457,314
FLOAT VALVE OPERATING MECHANISM
Filed Oct. 29, 1919
2 Sheets-Sheet 2
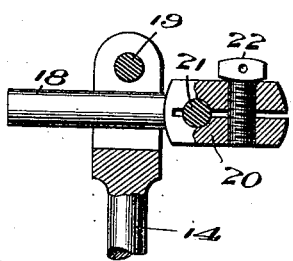
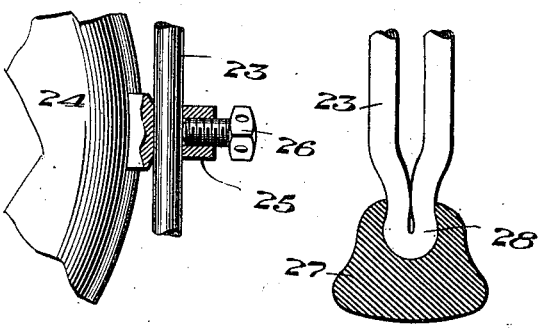
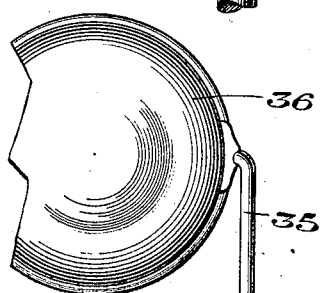
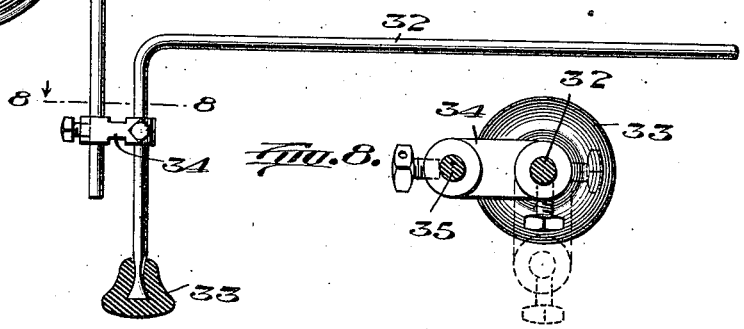
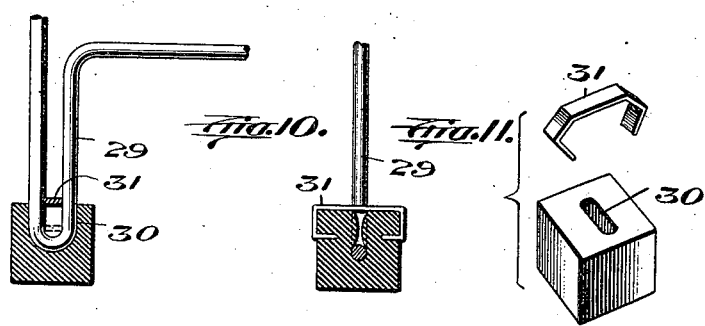
Witnesses
Philip E. Barnes
Inventor
Philip Mueller Patented June 5, 1923.

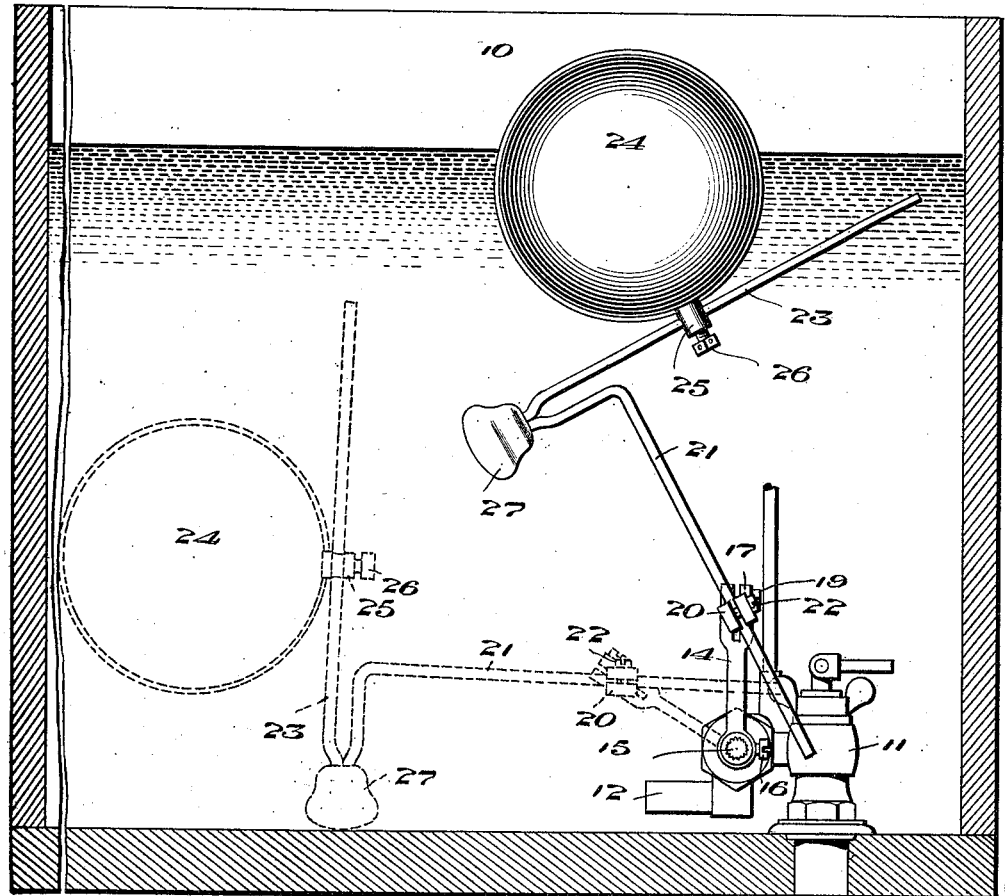

1,457,314

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FLOAT-VALVE-OPERATING MECHANISM.

Application filed October 29, 1919. Serial No. 334,121.

*To all whom it may concern:*

Be it known that I, PHILIP MUELLER, a citizen of the United States, residing at Decatur, in the county of Macon and State of Illinois, have invented new and useful Improvements in Float-Valve-Operating Mechanism, of which the following is a specification.

The present invention relates to float valve operating mechanism for closet tanks, and has for its object to provide a connection between the inlet valve and the float, which may be conveniently and readily adjusted to accommodate tanks of different dimensions, both as to length, width, and depth and which may be adjusted to give varying depths of fill so that a practically universal adjustment of the ball relative to the tank and the valve may be secured, and, furthermore, provision is made whereby the operating parts, particularly the float, are protected from shock when the tank empties and the float with its connecting rods falls.

In the drawings herewith,

Figure 1 is a longitudinal sectional view of so much of a tank as is necessary to illustrate my invention, showing an inlet valve and my improved float connection, the float being shown in its two extreme positions in full and dotted lines.

Figure 2 is a plan view of the float and its connections, so much of the valve being shown as is necessary to illustrate the connection of the float thereto.

Figure 3 is a detail view to show the reversibility of the parts.

Figure 4 is a detail sectional view of the connection shown in Figs. 2 and 3.

Figure 5 is a detail of the float and its adjustable connection with the float-carrying rod.

Figure 6 is a detail of the bumper for the float and its connections.

Figure 7 is a view of a slightly different form of float connection.

Figure 8 is a detail view on the line 8—8 of Figure 7.

Figures 9, 10 and 11 are detail views of a slightly different form of bumper.

Referring to the drawings by numbers, like numbers indicating like parts in the several views, 10 designates a tank of any suitable form and dimensions. The tank is provided with an inlet valve 11 connecting with the usual supply pipe, and in the present instance shown as entering at the bottom of the tank, as is customary, although it will be understood that the disposition of the inlet relative to the tank is not material. The said valve 11 is provided with a suitable outlet 12 of any desired form, which is controlled by a valve (not shown), which valve in the present instance is of the quick compression type, and is operated by the quick screw 13, (see Fig. 2). Adjustably mounted on the end of this screw is a valve operating arm 14, the said arm being preferably mounted, as shown in Fig. 1, on the corrugated stem 15 of the quick screw 13, the arm 14 being correspondingly corrugated so that a very exact angular adjustment of the arm 14 about the corrugated valve stem 15 can be secured, and the position of the arm 14 varied as the necessities of the case may require, the arm being held from endwise movement by means of a set screw 16. The arm 14 at its outer end is forked, as shown at 17, and provided with a seat to receive an adjustable rod 18, which rod is clamped in the fork 17 by the clamping screw 19, and may be adjusted in its seat so as to secure an adjustment widthwise of the tank as shown in the present embodiment, and the said rod 18 while it is shown as a relatively short rod may, of course, be of desired length. Not only is the rod 18 adjustable longitudinally in the fork 17, but it may be adjusted angularly in its seat so as to give any desired inclination to a fork 20 at the end of the rod, which fork 20 is designed to receive the float-carrying rod 21, which is longitudinally and angularly adjustable therein, being clamped in place by the clamping screw 22.

It will be observed that the rod 18 may be mounted in the position shown in Figure 2 so that the float rod 21 will lie on one side of the arm 14, or it may be reversed as shown in Fig. 3, so that the float rod 21 will lie on the other side of the said arm 14, so that if there is not clearance enough on one side for the float carried by the rod 21 it can be readily reversed and placed upon the other side.

The rod 21, as shown in Figure 1, is substantially T-shaped, having the limb 23 upon which is adjustably mounted the float 24, the said float having the perforated lug 25 which slides freely on the limb 23, a set screw 26 being provided to clamp the float in any position of adjustment.

The rod 21 may, if desired, be L-shaped, that is, the limb 23 may be dispensed with and the rod 21 given a right angle bend to form a substantially L-shaped rod, such construction providing a very simple and efficient form of rod.

With this construction, it will be seen that a universality of adjustment is secured for the float which will accommodate it to a variety of conditions under which it may be necessary to install the valve 11 and its operating parts. The arm 14 is angularly adjustable about the valve stem 15 so that it may be placed in any position necessary to give efficient opening and closing movements to the valve. The rod 18 is adjustable at right angles and angularly with respect to the arm 14, so that the float rod carried by it may be positioned close to or away from the plane of the arm 14, and by reason of the reversibility of the arm, as shown in Figs. 2 and 3, may be placed on either side thereof. The float rod 21 is longitudinally and angularly adjustable in the fork 20 of the rod 18, so that the distance of the float from the valve 11 and its angular position may be varied, and finally the float 24 may be adjusted along the limb 23 to accommodate the needs of the particular installation.

In order that these connections may be relieved so far as possible from shock, and that the float proper may not be injured, I preferably provide the float-carrying rod with a bumper 27, which is conveniently attached, as shown in Figs. 1 and 6, to an outwardly bent and crimped section 28 of the rod 21 and the limb 23, the loop thrown outwardly from these rods being pinched or crimped at its lower end so as to form an enlargement over which the bumper 27 of rubber, or other suitable material, may be engaged.

With this construction upon descent of the float the bumper 27 will strike the bottom of the tank and absorb the shock of the falling parts, so that any danger of loosening the connections heretofore described between the valve and the float is eliminated.

In Figs. 9, 10 and 11 I have shown a slightly different form of bumper and a convenient method of securing it to the looped float rod. In that construction the loop 29 of the rod is not crimped, as shown in Fig. 6, but is left open, being designed to enter a slot 30 formed in the bumper block, and is there secured by means of a clip 31, which, straddling the block and passing through the loop 29, has its ends embedded in the sides of the block, as shown in Fig. 10, compressing the rubber so as to clamp it firmly above the loop 29.

In Figs. 7 and 8 a slightly different form of float mounting is disclosed, the rod 32 being bent at right angles as shown, and provided at the end of its lower leg with a bumper 33 and designed to engage the adjustable and reversible rod 18 in a manner similar to that heretofore described. The said rod 32 has a block 34 adjustably mounted thereon and held by a set screw, said block having at its upper end an aperture through which passes a rod 35 secured in any suitable manner to the float 36, the said rod 35 being adjustably held in the block 34 by a suitable set screw, as shown. By this construction an adjustment of the float may be secured both vertically and angularly, as it may be swung, as illustrated in the dotted lines in Figure 8, to any position desired, and its height may, of course, be regulated by adjusting the block 34 up or down, or by adjusting the rod 35 up or down in said block.

It will be understood that mechanical variations in the construction shown and described may be made without departing from the spirit of my invention, and all such expedients as are within the range of mechanical skill I regard as within the purview of my invention.

What I claim is:—

1. In combination, a valve casing, a valve in said casing, a float, and connections between said valve and float to permit adjustment of said valve and float longitudinally, laterally, and vertically relative to each other.

2. In combination, a valve casing, a valve in said casing, a float, and connections between said valve and float to permit adjustment of said valve and float longitudinally, laterally, vertically, and angularly relative to each other.

3. In combination, a valve, a float, a rod connected to the float, and a lateral arm associated with the valve and rod permitting longitudinal and lateral adjustment of the float relative to the valve.

4. In combination, a valve, an operating arm for said valve, a float, a rod, an arm interposed between said operating arm and rod to permit lateral and longitudinal adjustments of said rod relative to said operating arm.

5. In combination, a valve, an angularly adjustable operating arm for said valve, a float, and a rod connecting said arm and float, and longitudinally and laterally adjustable relative to said arm.

6. In combination, a valve casing, a valve in said casing, an operating arm for said valve, a connecting rod laterally adjustable in said arm, a float-carrying rod longitudinally adjustable in said connecting rod, and a float vertically adjustable on said carrying rod.

7. In combination, a valve casing, a valve in said casing, an operating arm for said valve, a connecting rod laterally adjustable in said arm, a float-carrying rod longitudinally adjustable in said connecting rod, and a float vertically and angularly adjustable on said carrying rod.

8. In combination, a valve casing, a valve in said casing, an operating arm for said valve, a connecting rod laterally adjustable and reversible in said arm, a float-carrying rod longitudinally adjustable in said connecting rod, and a float vertically and angularly adjustable on said carrying rod.

9. In combination, a valve, an operating arm for said valve, and a float valve carrier reversibly mounted on said arm and laterally adjustable relative thereto, adapted to permit different positions of a float relative to said valve.

10. In combination, a valve, a substantially T-shaped rod connected with said valve, a float on one of the T-head limbs, and a bumper on the other T-head limb.

11. In combination, a valve, a substantially T-shaped rod connected with said valve, a float adjustably mounted on one of the T-head limbs, and a bumper on the other T-head limb.

12. In combination, a valve, a substantially T-shaped rod connected with said valve, a float on one of the T-head limbs, and a bumper detachably secured on the other T-head limb.

13. In combination, a valve, a rod connected with said valve of substantial T-shape with its head formed of two limbs detachably connected, a bumper on one limb, and a float on the other limb.

14. In combination, a valve, a rod connected with said valve of substantial T-shape with its head formed of two limbs adjustably connected, a bumper on one limb, and a float on the other limb.

15. In combination, a valve, a rod connected with said valve of substantial T-shape with its head formed of two limbs so connected as to be longitudinally and angularly adjustable relative to each other, a bumper on one limb, and a float on the other limb.

16. In combination, a valve, a rod connected with said valve of substantial T-shape with its head formed of two limbs, a bumper on one limb, a float on the other limb, and a clamp connecting said limbs detachably and adjustably.

In testimony whereof I have hereunto set my hand.

PHILIP MUELLER.